Sept. 27, 1966    C. H. HERR    3,274,717
AUTOMATIC CALENDAR
Filed April 16, 1964    7 Sheets-Sheet 1
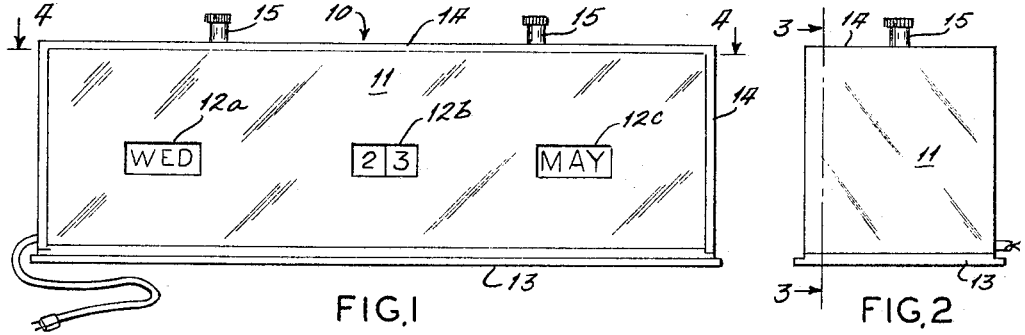
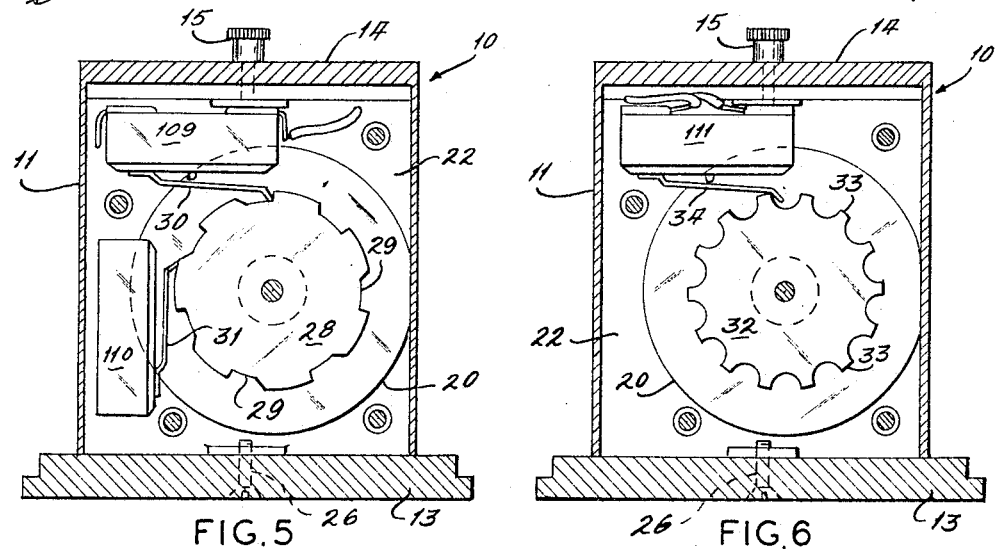
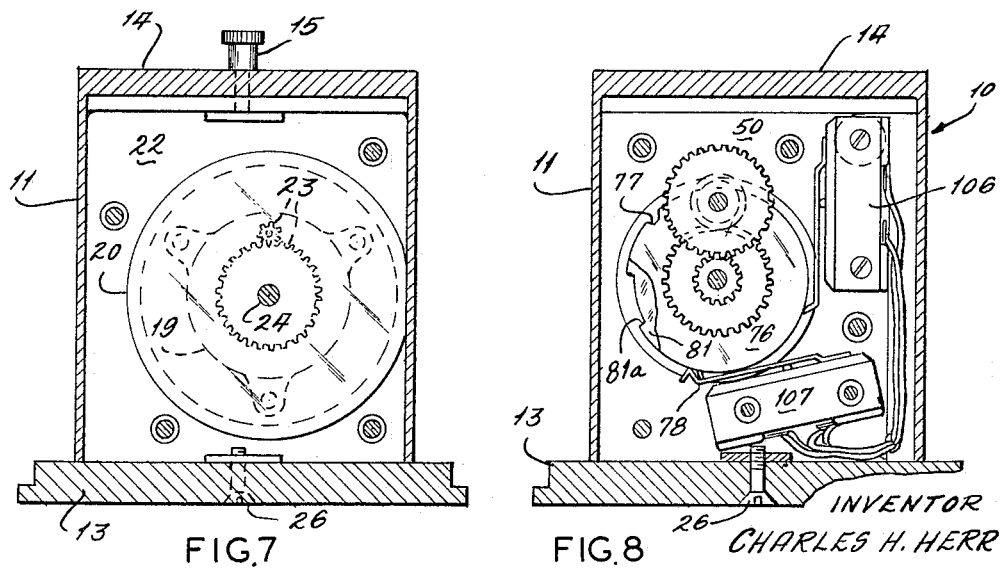
INVENTOR
CHARLES H. HERR
BY Gravely, Lieder & Woodruff
ATTORNEYS.

Sept. 27, 1966 C. H. HERR 3,274,717
AUTOMATIC CALENDAR
Filed April 16, 1964 7 Sheets-Sheet 2

INVENTOR:
CHARLES H. HERR
BY Gravely, Lieder & Woodruff
ATTORNEYS.

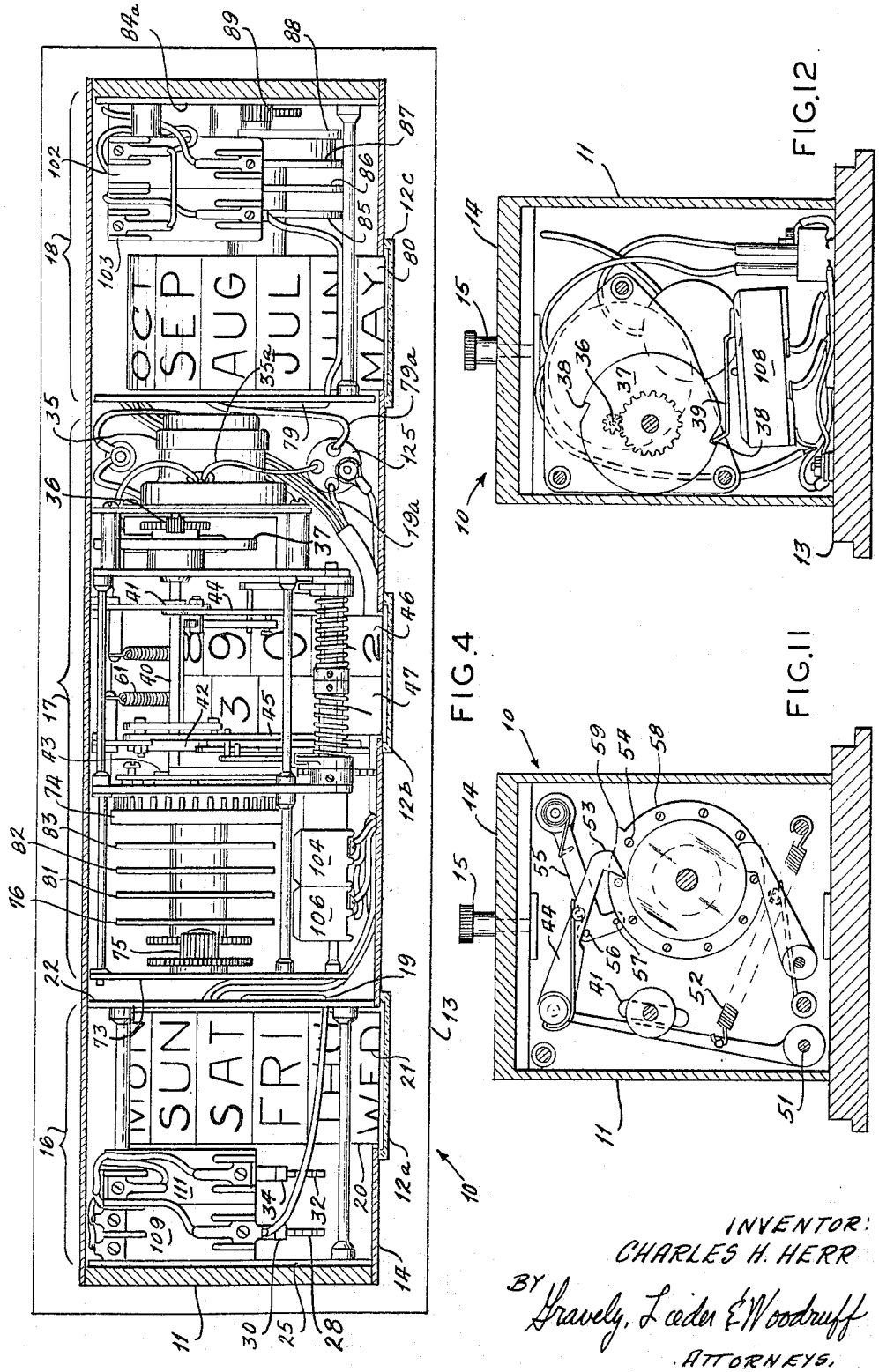

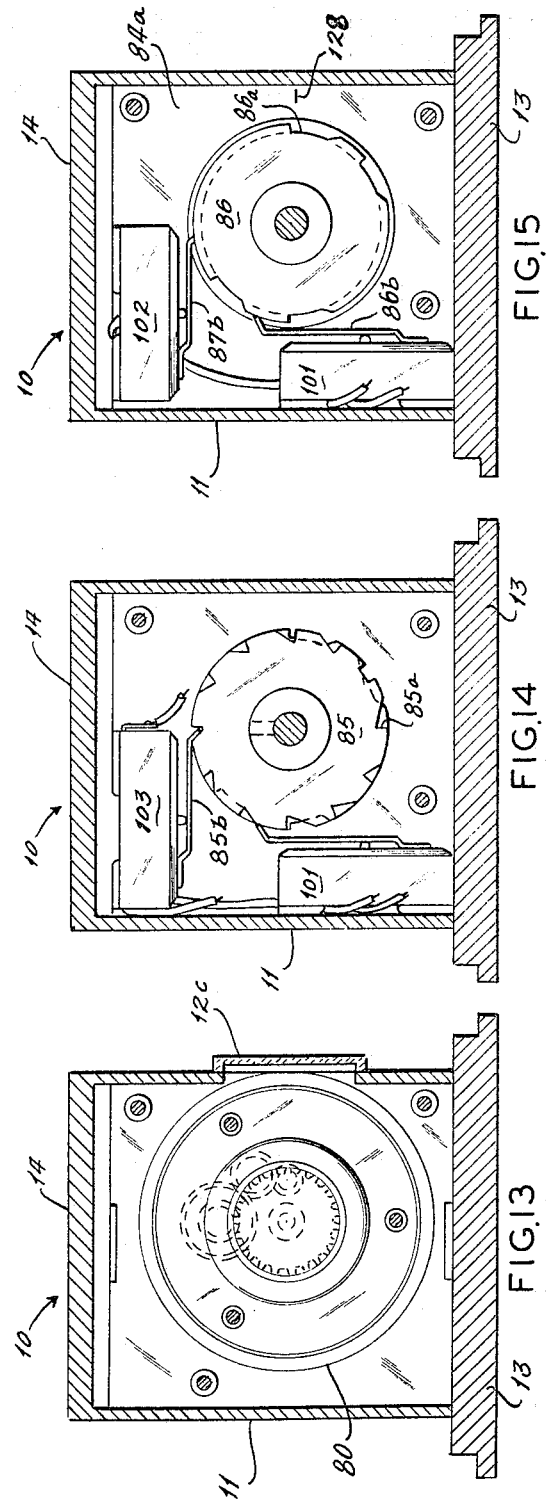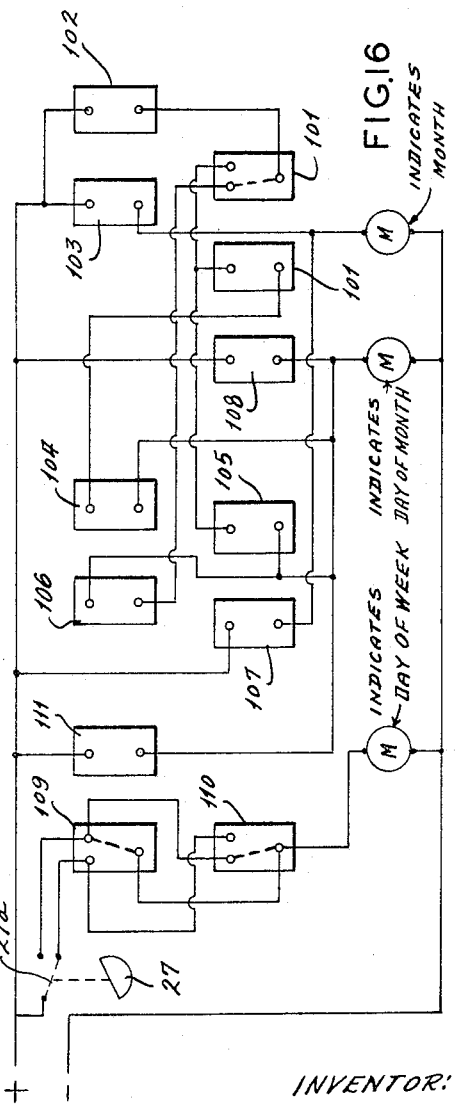

Sept. 27, 1966     C. H. HERR     3,274,717
AUTOMATIC CALENDAR

Filed April 16, 1964     7 Sheets—Sheet 5

INVENTOR:
CHARLES H. HERR
BY Gravely, Lieder & Woodruff
ATTORNEYS.

INVENTOR:
CHARLES H. HERR
BY Gravely, Lieder & Woodruff
ATTORNEYS.

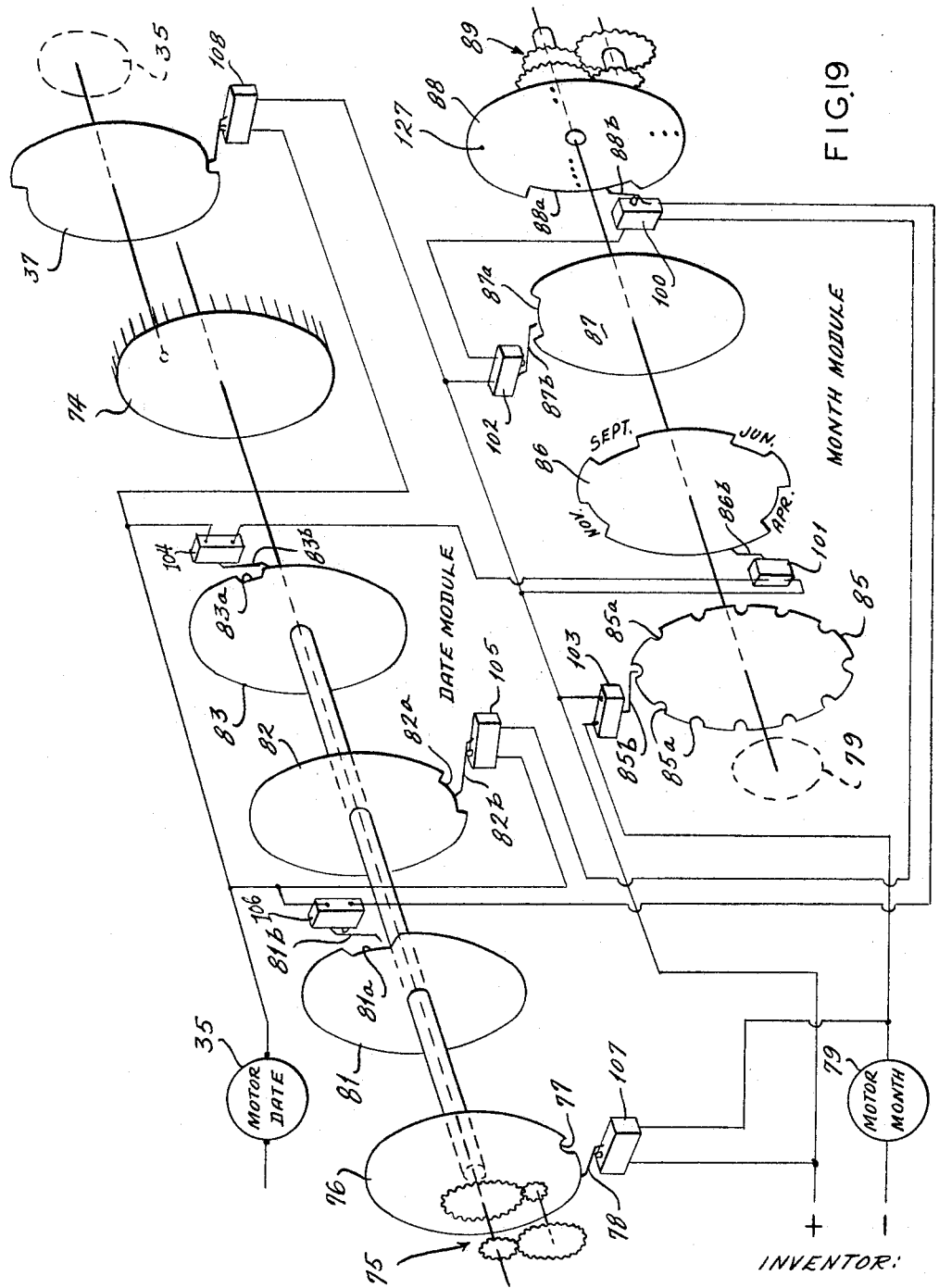

3,274,717
AUTOMATIC CALENDAR
Charles H. Herr, St. Louis, Mo., assignor of one-half to
L. W. Matheny, Brentwood, Mo.
Filed Apr. 16, 1964, Ser. No. 360,199
10 Claims. (Cl. 40—111)

The present invention relates to an electro-mechanical motor driven calendar, and particularly relates to a perpetual calendar having self-compensating adjustments for the various months having different numbers of days, including self-compensating adjustments for the leap years.

One of the principal objects of the present invention is to provide a simple, efficient, inexpensive perpetual calendar which does not need to be reset until the year 2100.

Another object of the present invention is to provide a modular calendar construction having separately replaceable modules indicating the days of the week, the date, and the months.

Still another object of the present invention is to provide a perpetual calendar wherein the months, dates, and days of the week are automatically changed each day upon reception of an electrical impulse.

Still another object is to provide a perpetual calendar including a series of motors, cams, and switches in a relatively simple and inexpensive construction which does not need adjustment at the end of a month or year.

Another object of the present invention is to provide a perpetual calendar which may be used with or installed in cash registers, time clocks, metering machines, aircraft, banks, airports, schools, public buildings, automobiles, buses, terminals, stores, offices and homes.

Still another object of the present invention is to provide an automatic calendar for indicating automatically the day of the week, the date of the month, and the month of the year, continuously, without the necessity of manually resetting the device to compensate for months having a different number of days or a leap year.

Another object is to provide an automatic calendar which is immune to power failure for a reasonable length of time, particularly at the time of cycling.

Another object is to provide a reliable automatic calendar and in accomplishing this, the number of parts is kept to a minimum, and those parts as used are not of such delicate nature as would impair their reliability or cause excessive cost to manufacture.

These and other objects and advantages will become apparent hereinafter.

The present invention comprises a series of motors which operate rotatable drums which have respectively indicia designating the days of the week, the date and the month on the outer faces thereof, in combination with a series of cams and switches which provide compensation for the different numbers of days in the various months, including an automatic leap year compensation.

In the drawings, wherein like parts refer to like numbers wherever they occur,

FIG. 1 is a front elevational view of the present invention,

FIG. 2 is a side elevational view of the present invention,

FIG. 3 is a vertical sectional view taken along line 3—3 of FIG. 2,

FIG. 4 is a horizontal sectional view taken along line 4—4 of FIG. 1,

FIGS. 5–15 are vertical sectional views taken along lines 5—5—15—15, respectively, of FIG. 3, FIG. 16 is a diagrammatic arrangement of the present invention showing the relative location of the parts.

FIG. 19 is a perspective view of the switch and cam arrangement of the date and month modules.

Figures 3, 9, 10:
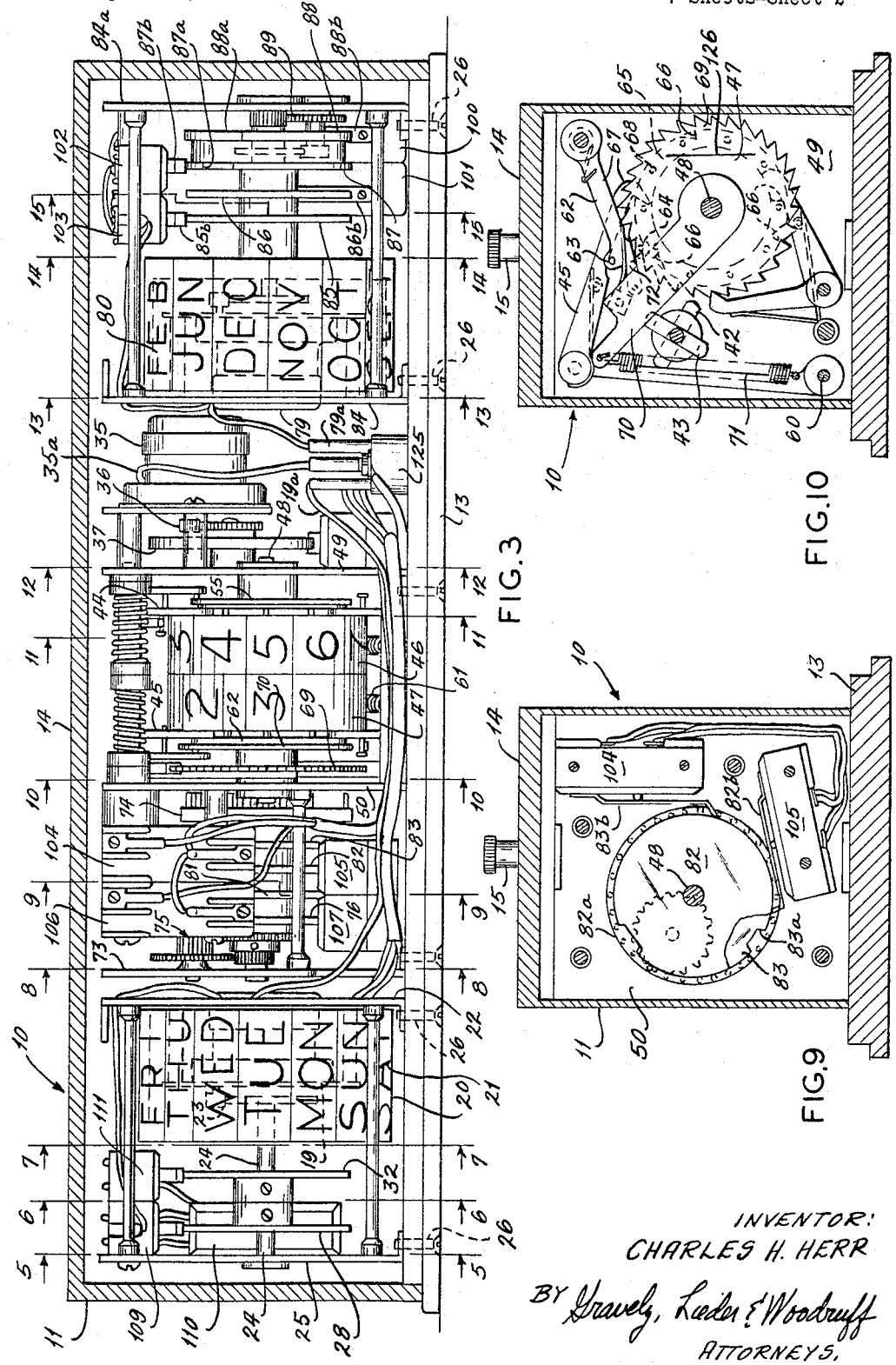

A timing device is necessary to provide an initial impulse to cycle the calendar. A clock, including a cam and switch arrangement, may be used, or a timer may be used.

The calendar is made in a number of complete modules so that they can be used in various combinations and disposed as desired as no mechanical connections are required. The connection between modules is made by electrical wiring.

Timing of the impulses to initiate operation of the separate modules is an important requirement. It is provided by using constant speed motors and gear ratios designed to require a predetermined time period for each operation and as applied is a simple and reliable method.

As will be explained hereinafter a timed impulse is provided to start the module motors, and after starting, the module motors themselves actuate cams and switches that control the final pre-set position of the indicating drums. The present structure has the advantage of eliminating the need of all types of magnetic relays with their multiplicity of contacts and complications of wiring.

As mentioned previously, a clock is needed to provide the primary impulse to start a cycle of operation. No attempt is made to design a clock for purposes of this invention as almost any clock could be used when modified to provide a two-position cam, making one revolution in 48 hours, and a double throw switch, operated by said cam, is incorporated in its mechanism. In special uses, it may be preferred to use a simple timer consisting of a clock motor and gearing to produce an output shaft speed of 1 revolution per 48 hours, upon which a two-position cam could be mounted to operate a double throw switch incorporated with the timer unit.

As an example of a special purpose, I mention the use of a decorative clock and the modules of the calendar mounted upon the wall of a public building and taking up a comparatively large area, and especially an installation whereby the calendar modules were added to an existing decorative clock installation. Some of the uses as hereinbefore mentioned may also require a timer.

The present invention comprises a perpetual calendar 10 which is mounted in a casing 11 having three openings 12a–c in the front face through which the day of the week, the date and the month, respectively, are visible. The casing 11 comprises a base 13 and top cover 14 which is held in place by fastening means 15. The top cover 14 is removable to provide access to the mechanism for replacement or repair.

The operating portions of the calendar 10 are separated into three modules which are independent mechanically, but which are interconnected electrically. The modules include a day of the week module 16, a date module 17, and a month module 18 (FIG. 4). This arrangement allows the modules 16, 17 and 18 to be separated, as for example, if installed in a wall of a bank or public building. Also, many units can be operated by a single impulse, using the module construction.

Day of the week module

The day of the week module 16 includes an electric motor 19 positioned within a rotatable drum 20 which has indicia 21 on the outer surface to represent the day of the week, i.e., Monday, Tuesday, etc. Each day of the week is depicted twice on the drum 20, so that there are fourteen positions of the drum 20. The motor 19 is mounted in a plate 22 and drives the drum 20 through gears 23 attached to the drum 20 and to the motor output shaft 24 whose other end is journaled in a second end plate 25. The plates 22 and 25 define the day of the week module 16 and are mounted to the base 13 by suitable fastening means 26.

A cam 27 operated by a clock or timer (not shown) rotates 180° to close the switch 27a and supply an electrical impulse which energizes the day of the week motor 19, which, through the suitable gearing 23, drives the drum 20 $\frac{1}{14}$ of a revolution. The cam 27 is constructed and arranged to turn a half revolution every 24 hours. A cutoff cam 28 (FIG. 5) having seven equally spaced slots 28 in its outer surface is engaged by two feelers 30 and 31 connected to suitable switches 109 and 110 which de-energize the motor 19 when either of the feelers 30 or 31 ride off the raised cam surface and drop into one of the cutout portions 29 of the cam 28. A second actuating cam 32 (FIG. 6) is connected to the motor output shaft 24 and is provided with fourteen raised portions 33 on its outer edge. A feeler 34 connected to a switch 111 rides on the outer edge of the cam 32 and energizes a date motor 35 mounted on the date module 17, when the feeler rides up on one of the raised portions 33 of the cam 32. The raised portions 33 on the energizing cam 32 are aligned intermediate the raised portions and cutout portions 29 of the cutoff cam 28, so that when the cutoff cam 28 de-energizes the day of the week motor 19 (and stops rotation of the cams 28 and 32), the feeler 34 for the date motor 35 is in a cutout portion on the energizing cam 32. The drop-off action of the feelers 30 and 31 is for accuracy, and one of the feelers and its associates switch may be eliminated by accurate placement of the raised and cutout portions of the cam 28.

To start the sequence of operation, it is necessary to provide a connection between the switch 27a activated by the cam 27 in the clock or timer and the switches 109 and 110 activated by the cam 28 in the day of the week module 16 as shown in FIG. 5. The cam 27, making one revolution in 48 hours and shaped to provide two positions of a finger connected to the double throw switch, is used. This arrangement is used to re-position switch 27a to alternate positions every 24 hours.

The switches 109 and 110 positioned by the cam 28 as shown in FIG. 5, are used to run the motor 19 and stop it at the right time to provide the next day of week position of the cam 28 and the indicating drum 20 by causing an advance of $\frac{1}{14}$ of a revolution of the cam 28.

A cycle is started each time the switch 27a has its position alternated by the cam 27 from one position to the other, which in effect occurs every 24 hours.

Figure 18A:
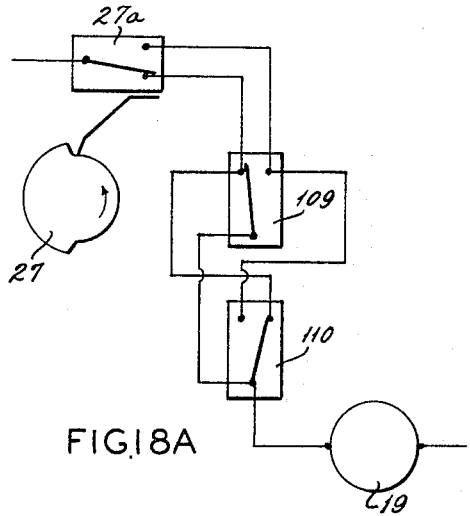
FIGS. 18A, 18B, 18C, 18D, 18E show schematically the sequence of operation of the cam and switch arrangement in initiating the mechanism.

FIG. 18a shows the circuit as completed at the instant the feeler of the switch 27a has established contact as it moved to lower section of the cam 27. At this point, rotation of the motor 19 starts, turning the drum 20 and the cam 28 until $\frac{1}{14}$ of a revolution is achieved and the feeler 30 of the switch 109 drops off the edge of the cam projection 29 and the feeler 31 of the switch 110 has risen to the top of the cam projection 29, stopping movement of the drum 20 and the cam 28 as shown in FIG. 5.

Figure 18B:
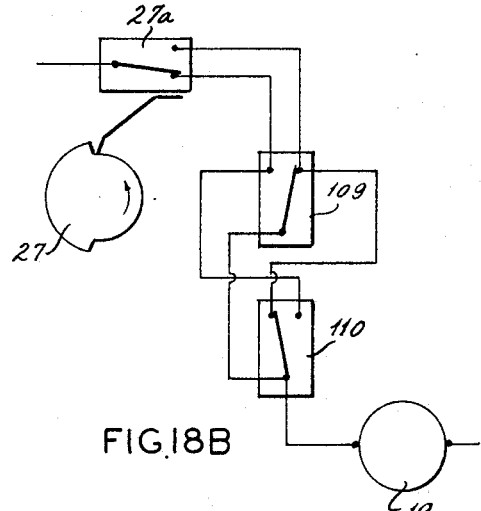

Completion of this movement has caused the contact members of the switches 109 and 110 to be shifted to the positions shown in FIG. 18b, and the cam 28 and the drum 20 to the position shown in FIG. 5. The positions of the cam 27 and the switch 27a have not perceptably changed. The switches 109 and 110 are now in open position.

Figure 18C:
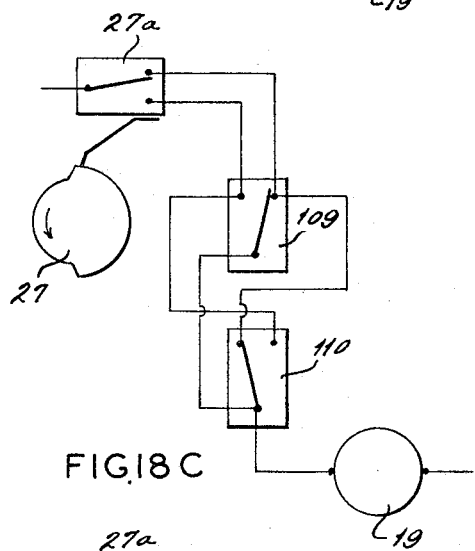

FIG. 18c shows the feeler of the cam 27 has risen to the high position after 24 hours and the switch 27a has shifted to the alternate position and a circuit is closed through switches 109 and 110. All elements are in position to start the second impulse.

Figure 18D:
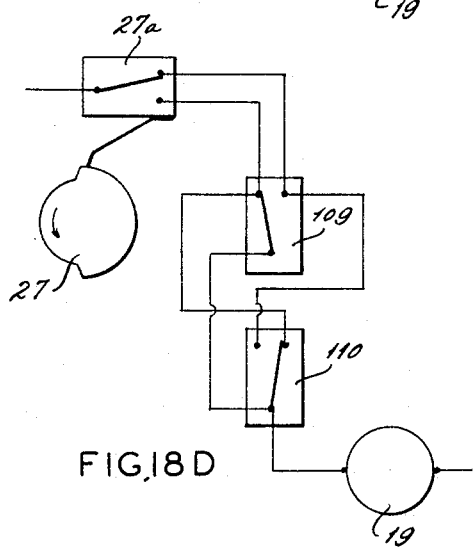
Figure 18E:
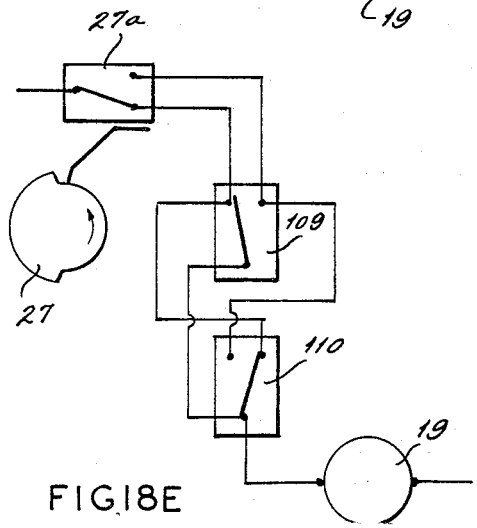

FIG. 18d shows the cam 27 and the switch 27a in practically the same position as shown in FIG. 18c, but a cycle has been completed and while switches 109 and 110 have stopped this cycle, the same action has re-positioned the contacts to start the next cycle, when the cam 27 re-positions the switch 27a as shown in FIG. 18e.

In FIG. 18e, all elements are in the same position as shown in FIG. 18a and represent the position of the cam 27 and the switches 27a, 109 and 110 at the end of a second 24-hour cycle or one complete revolution of the cam 27.

The design of the cam 28 and arrangement of the switches 109 and 110 provides an accurate method of positioning the drum 20 (FIG. 7), and in conjunction with the cam 27 and the switch 27a, provides a very dependable method of providing a 24 hour impulse circuit, which also is able to pick up the cycle should there be an interruption of power. If interruption of power has been of sufficient time to affect the clock or timer, the act of adjusting the clock or timer for time lost will provide the impulse to the calendar if necessary.

The positioning effect of the cam 28 and the switches 109 and 110 can be explained by referring to FIG. 5. The cam 28 has seven projections and seven cut-outs of equal length. The cut-outs have an incline to guide the feelers of the switches 109 and 110, which makes it in effect slightly shorter than the projections, hence the switch with its feeler in the cut-out will always operate first. By reference to FIG. 18, it is seen that the switches 109 and 110, in effect, are in parallel, and the switch with its feeler in the cut-out will always break circuit first, consequently the switch on the top portion of the cam 28 will always give the final break in an abrupt manner by dropping off the high position of the cam. The operation is such that the switches 109 and 110 alternate their positions. When operating under these conditions, lost motion or variations in switch or cam characteristics do not seriously affect the stopping point, consequently, accurately positioned indications of the day of the week are produced without the use of any separate braking feature.

*Date module*

As mentioned, the date module motor 35 is energized from the cam 32 operated by the day of the week motor 19. The date motor 35 has an output shaft 36 which drives a rotatable cam 37 (FIG. 12) provided with a pair of spaced cutout portions 38 separated by 180°. A feeler 39 for a switch 108 rides on the outer edge of the de-energizing cam 37 and inactivates the motor 35 when the feeler 39 rides into one of the cutouts 38. Therefore, the de-energizing cam 37 makes 180° rotation each time the date motor 35 is energized. A rod 40 is driven by the de-energizing cam 37 and also makes 180° rotation each time the motor 35 is energized. A series of bar cams 41, 42 and 43 are fixed to the rod 40 and rotate therewith. The bar cams 41 and 42 operate arms 44 and 45, respectively, which, in turn, operate the independently rotatable drums 46 and 47 which have indicia indicating the date on their outer surfaces. The right hand drum 46 (FIG. 4) is divided into ten digits, i.e., 0, 1, 2 . . . 9, etc. The left hand drum 47 is divided into eight increments, i.e., 1, 2, 3, —, 1, 2, 3, —. The drums 46 and 47 are mounted on a spindle 48 which is journaled in a pair of brackets 49 and 50 which are mounted on the base 13.

The right hand drum 46 is rotatable by the puller arm 44 which is pivotally attached at 51 to a spindle mounted between the plates 49 and 50 and urged toward the first bar cam 41 by a spring 52. The arm 44 has a hook portion 53 which engages a series of spaced rods 54 on the first drum 46. A pivotable spacer member 55 is provided with an arm 56 against which the puller arm 44 rests, and a second cam engaging arm 57 which rides along the surface of a cam member 58 having one projection 59 on its surface. The cam 58 is rotatable with the spindle 48. The purpose of the raised projection 59 is to lift the puller arm 44 and prevent its engagement with the drum rods 54 (and consequent rotation of the drum 46 on retraction of the arm 44 by movement of the bar cam 41) when a month having 31 days ends. In other words, the "1" setting on the drum 46 is not disturbed in going from the 31st day of a preceding month to the first day of a subsequent month. Similarly, as will be explained in more detail hereinafter, when compensations for 30 day, 29 day, and 28 day months are set into the device, the number "31" is eventually set on the drums 46 and 47, and the "1" setting on the right hand drum 46 remains as the date module 17 is set to the first day of the succeeding month.

The second puller arm 45 also is pivotally attached at 60 to the spindle between the brackets 49 and 50 and is urged toward the left hand drum 47 by a spring 61. The arm 45 is operated by the bar cam 42 and is normally held in retracted position (FIG. 10) by the bar cam 42. A pivotable spacer member 62 which is mounted between the plates 49 and 50 is provided with a member 63 which supports the puller arm 45 and a second member 64 which rides on a cam 65 having four spaced notches 66 in its outer edge. When the spacer member 62 rides into one of the cam notches 66, a hook 67 on the end of the puller arm 45 is allowed to drop into engagement with bars 68 on the left hand drum 47, so that subsequent retraction of the arm 45 by the bar cam 42 rotates the drum 47 ⅛ revolution. This changes the number of the day from 9 to 10, from 19 to 20, and from 29 to 30, as well as from 30 or 31 to 1. Two of the notches 66 are closely adjacent to one another to cause the proper change from 29 to 30 and subsequently from 30 or 31 to 1.

The cam 65 also rotates on the spindle 48 and makes one complete revolution each 31 impulses because of a drive wheel 69 having 31 teeth mounted on the outer edge. The teeth are engaged by a pusher bar 70 operated by the third bar cam 43 which, as previously mentioned, also is rotatable with and fixed to the rod 40. The bar 70 is pivoted on the spindle 48 and spring 71. A push rod 72 engages the teeth of the drive wheel 69 to rotate the wheel 1/31 revolution with each impulse to the motor 35 (FIG. 10). The teeth on the drive wheel 69 are so aligned with the cam notches 66 and the numbered indicia on drums 46 and 47 that the cam notches 66 correspond to the first tooth, the tenth tooth, the twentieth tooth, and the thirtieth tooth on the drive wheel 69. Thus the drum 47 is moved to change the date from 9 to 10, 19 to 20, etc., as previously explained.

A series of four cams are rotatably mounted between the bracket plate 50 and an end bracket 73 and driven by a gear 74 mounted on the end of the rod 40 through a series of gears 75. The cam assembly includes a month motor actuating cam 76 having one notch 77 in its periphery into which a feeler 78, connected to a switch 107, falls at the end of the month (FIG. 8). The switch 107 energizes a month motor 79 to rotate a month wheel 80 one increment (½ revolution). The month motor 79 and month wheel 80 are located in the month module 18.

The other cams 81, 82 and 83 are provided with elongated cutout slots 81a, 82a and 83a respectively, corresponding to 28 day, 29 day and 30 day months. The slots 81a, 82a and 83a are of different lengths, corresponding to 3/31, 2/31 and 1/31 of the circumferences, respectively. When the respective feelers 81b, 82b and 83b of the switches 106, 105 and 104, respectively, fall into the cutout portions of the cams, the date motor 35 is activated for 3, 2 or 1 additional impulses to drive the drums 46 and 47 into proper position for starting the first day of the subsequent month. In other words, the date motor 35 receives 31 impulses every month regardless of the number of days which might be in that month. The cams 76, 81, 82 and 83 are all journaled on the same shaft and thus rotate one revolution each 31 impulses. However, the cams in the month module 18 determine which of the additional impulse cams 81, 82 or 83 will take effect on the date motor 35.

As mentioned, the impulse required to start operation of the module 17 starts with an impulse from the switch 111 activated by the cam 32 in the day of week module 16. The motor 19 of the day of week module 16, having been started by the switch 27a in the clock or timer, moves the cam 32 (FIG. 6) 1/14 of one revolution and is geared to do this in 12 to 14 seconds. The raised portion (33) of the cam 32 (FIG. 6), having a length approximately ⅓ of the distance cam 32, moves 1/14 revolution to provide an impulse through the switch 111 of approximately 4 to 5 seconds to activate the motor 35 of the date of month module 17.

As the motor 35 starts, the finger of the switch 108 rides out of the cut-out of the cam 37 (FIG. 12) and closes a circuit through the switch 108. This, in effect, puts the switches 111 and 108 in parallel to feed the motor 35 of the date module 17. After 4 to 5 seconds, the switch 111 opens, leaving the switch 108 to feed the motor 35 until the motor 35 stops by the action of the finger 39 of the switch 108 entering the second cut-out 38 of the cam 37. The motor 35 is geared to rotate the cam 37 one-half revolution in approximately 24 seconds.

The date of the month module 17 requires 31 impulses to complete one cycle. When a month has 31 days, all impulses are supplied as just described. However, when a month has less than 31 days, it requires extra impulses to clear the date drums 46 and 47 of the remaining date indications, and also to furnish an impulse to the month module 18 so that it may advance to the next month.

As will be explained more fully hereinafter, a 28 day month requires three extra impulses as supplied through operation of the cam 81 and the leap year cam 88.

A 29 day month requires two extra impulses as supplied through operation of the cam 82 and the leap year cam 88.

A 30 day month requires one extra impulse supplied through the cam 83.

*Month module*

The month module 18 includes the month motor 79 which is mounted on a bracket 84 and is adapted to be actuated by the switch 107 at the end of each 31 impulses to the date motor 35. The month motor 79 drives the month drum 80 which has indicia representing the months of the year on its outer surface. On each impulse to the month motor 79, the drum 80 is rotated 1/12 revolution. A series of cams are connected to the output shaft of the month motor 79 (FIGS. 14 and 15). The cam 85 has 12 notches 85a in its outer edge and controls a feeler 85b connected to a switch 103 which deactivates the month motor 79 whenever the feeler 85b falls into a cam notch 85a.

The cam 86 is provided with four cut-outs 86a on the rim, each equal to 1/12 of the circumference and disposed around the rim in positions corresponding to the 30 day months of April, June, September and November, and is used in conjunction with the cam 83 and the switch 104 to produce one extra impulse at the end of each 30 day month to complete the 31 day cycle of date module necessary to start the proper indications for the following month. A feeler 86b for a switch 101 is controlled by the cam 86, and the switch 101 in turn controls the 30 day date cam 83. When the feeler 86b rides on the raised portions of the cam 86 and the feeler 87b rides on the raised portion of the cam 87 (corresponding to the 31 day months) the 28 day, 29 day and 30 day feelers 81b, 82b and 83b falling into the respective date cam slots 81a, 82a and 83a do not take effect. However, when the feeler 86b falls into a notch 86a on the outer surface of the cam 86 (corresponding to a 30 day month), the switch 101 is closed to energize the switch 104, so that when the 30 day date cam feeler 83b falls into the 30 day cam notch 83a (at the end of the 30th day of the month) an additional impulse is provided by the switch 104 to the date motor 35 to provide the 31st impulse necessary for that month.

The cam 83 has one cut-out 83a equal to 1/31 of the circumference or the equal of one day.

The cam 87 is provided to take care of February, and is in use irrespective of whether February is a 28 day or 29 day month. The cam 87 is secured to the same shaft that operates the cams 85 and 86 and is positioned, so that it corresponds with what would be the February position on the cam 86 and rotates in unison with cams 85 and 86 at one revolution per year.

The cam 88 is designed primarily to take care of leap year, but also is used to position the switch 100 for a 28 day month. The cam 88 is provided with approximately one-fourth of the circumference undercut 88a, into which the feeler 88b, connected to the single pole double throw switch 100, is seated when in the leap year position.

The cam 88 is mounted freely on the same shaft with cams 85, 86 and 87, and is caused to rotate at one-fourth shaft speed by gears 89, at the end of the shaft. This causes the undercut section 88a to be in leap year position once in four years.

The cam 87 provides a single cut-out 87a in its outer edge equal to 1/12 of the circumference, and when in the February position with the feeler 87b riding in the cut-out portion, the switch 102 is closed and causes circuit to be completed to the common connection of the doube throw switch 100. With the undercut section 88a of the cam 88 in leap year position and the feeler 88b connected to the switch 100 resting on the undercut section 88a of the cam 88, the circuit is completed through that side of the double throw switch 100 that is connected to switch 105, which in turn is closed by action of the cam 82 at a pre-set time. This will provide two extra impulses to bring the date module 17 to the proper position for the next 31 day cycle. The cam 82 is provided with a cut-out 82a equal to 2/31 of its circumference to provide the two extra impulses hereinbefore mentioned.

For the normal 28 day February of the following year, the cam 87 will have rotated one revolution and is in the same relative position as for the 29 day February. The cam 88 would have advanced only one-fourth of a revolution due to the 4–1 ratio of gearing 89.

In this position the switch 102 is again closed by action of the cam 87 and a circuit to the common connection of the switch 100 is completed. The cam 88, having advanced one-fourth revolution, has caused the feeler 88b of the switch 100 to rise to the high section of the cam 88, and by this action a circuit is completed through the alternate side of the double throw switch 100 to the switch 106, which is closed and the circuit completed by preset action of the cam 81.

The cam 81 is provided with a cut-out 81a equal 3/31 of its circumference to provide three extra impulses to bring the date module 17 to the proper position for the next 31 day cycle.

The cam 88, having one section for leap year and three sections for 28 day February, provides a four year cycle which is capable of continuous use until the year 2100.

By the rule that a centennial year must be evenly divided by 400, the year 2100 would break the cycle and require re-setting.

The impulse required to start operation of the month module 18 is started with an impulse from the switch 107 when activated by the cam 76 in the date module 17. The cam 76 is so positioned that as the date module 17 passes from the 31st position to start the cycle for the following month, it closes the switch 107 and starts the motor 79 of the month module 18. Starting of the motor 79 begins advancing the cam 85 in the month module 18, and causes the feeler 85b of the switch 103 to move out of the recess 85a in the cam 85 and rises to the high section thereof, which closes the switch 103 to close circuit. This, in effect, puts the switches 107 and 103 in parallel to feed the motor 79 of the module 17. The cam 85 is designed for 12 positions, and is geared to the motor 79 so as to require about 14 seconds to advance 1/12 of one revolution for an advance of one month.

After about six or seven seconds, the cam 76 in the date module 17 opens the switch 107 and allows the switch 103 to feed the motor 79 until the feeler 85b of the switch 103 falls into the next recess 85a in the cam 85, causing the switch 103 to open and stop the motor 79.

This operation has caused month wheel 80 (FIG. 4) to advance 1/12 revolution to indicate the next month.

*Operation*

Figure 17:
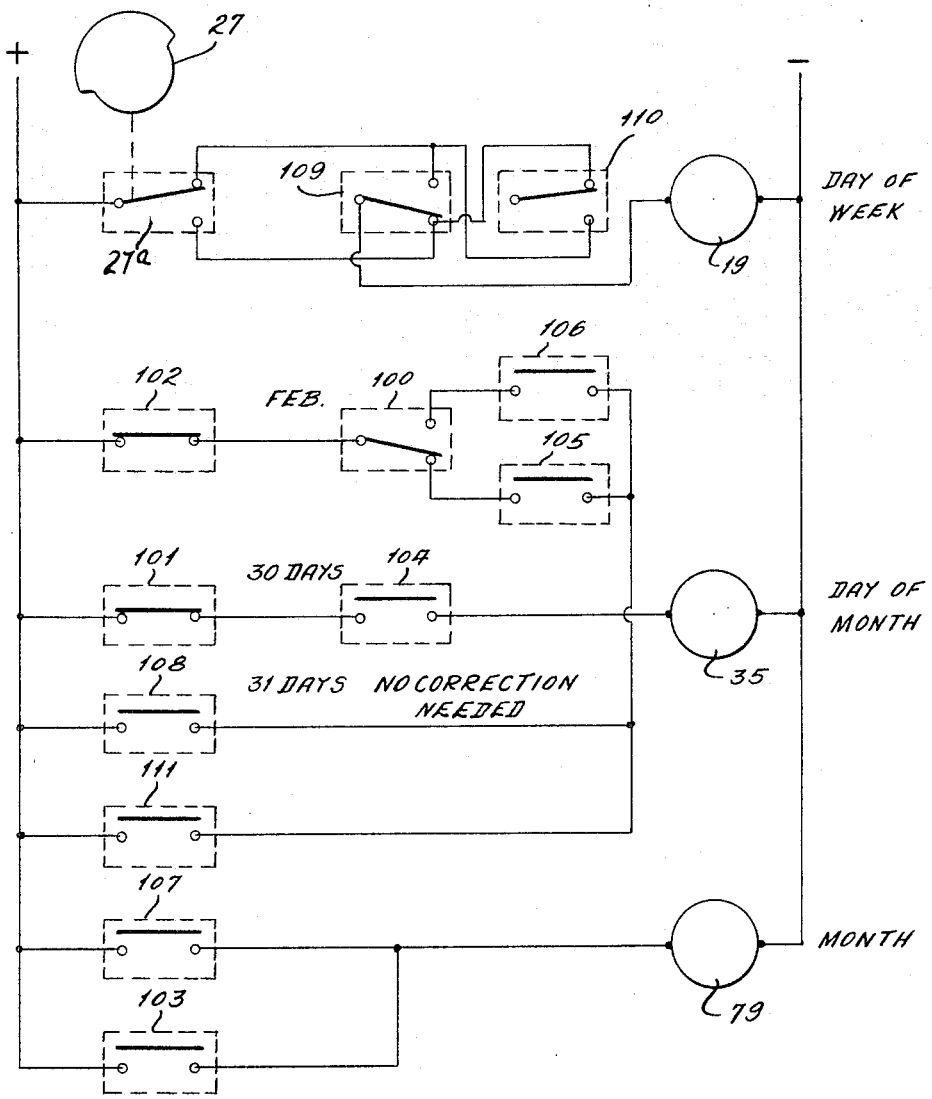
FIG. 17 is a schematic line drawing showing the position of all switches in the standing-still position waiting the next impulse.

Prior to receiving the daily impulse, the mechanism is in the rest position diagrammatically shown in the schematic line diagram of FIG. 17. The outlines of the switches are shown in broken lines in FIG. 17. The impulse to the mechanism comes when the time clock or other device (not shown) rotates the cam 27 one-half revolution to move the double throw switch 27a to its second closed position and initiate the movement of the calendar so as to change to the next day. The day of the week motor 19 is energized when the switch 27a is closed and rotates the drum 20 and the cam 28 until one of the feelers 30 or 31 drop into one of the cut-out portions 29 on the cam 28. This de-energizes the motor 19. The cam 32 closes the switch 111 prior to de-energization of the motor 19 to energize the date module motor 35, whose output shaft 36 rotates one-half revolution before being de-energized through the cam 37 and the switch 108. The bar cams 41, 42 and 43 also make 180° rotation from the motor 35. The bar cams 41 and 42 operate the arms 44 and 45 to turn the drums 46 and 47 which indicate the date on their outer surfaces. The right hand drum 46 is rotated one-tenth of a revolution each time the motor 35 is impulsed, except after the 31st impulse when the raised portion 59 on on the cam 58 prevents the arm 44 from rotating the drum 46. Thus the number 1 is left on the drum 46 to indicate the first day of the following month. The left hand drum 47 is operated by the arm 45 and is synchronized with the 31-toothed wheel 69 through the cam 65 to change the date from 9 to 10, from 19 to 20, from 29 to 30, and from 30 or 31 1. The action of the wheel 69 and the cam 65 also are synchronized with the cam 58 and its raised portion 59.

Thirty-one impulses are delivered to the motor 35 each month, so that compensations are needed for the 28, 29 and 30 day months. This is provided through the month module 18 and particularly the month motor 79. A four-cam assembly including the cams numbered 76, 81, 82 and 83 control the additional impulsing of the motor 35. When the feeler 78 drops into the notch 77 on the cam 76, the switch 107 energizes the month motor 79 to rotate the month wheel 80 one-twelfth revolution. The cams 76, 81, 82 and 83 rotate one revolution each 31 impulses to the date motor 35. When the feelers 81b, 82b and 83b of the switches 106, 105 and 104, respectively, fall into the cam slots 81a, 82a and 83a, the date motor 35 is conditioned for reception of 3, 2 or 1 additional impulses respectively to drive the drums 46 and 47 into proper position for starting the first day of the subsequent month. If the month has 31 days, no compensation is necessary.

The month motor 79 is deactivated when the feeler 85b for the switch 103 falls into a notch 85a on the cam 85. A second cam 86 connected to the output shaft of the motor 79 is provided with four slots 86a which are arranged on the outer surfaces of the cam 86 in the relative position of the 30 day months April, June, September and November. A feeler 86b for the switch 101 controls the 30 day date cam 83. Thus, when the feeler 86b is on the raised portions of the cam 86, the cams 81, 82 and 83 cannot take effect since the motor 35 is conditioned to receive 31 impulses from the switch 27a. When the feeler 86b falls into one of the notches 86a, the switch 104, operated by the feeler 83b and the cam notch 83a, is conditioned to provide an additional impulse to the date motor 35 to provide the 31st impulse for that month. The closed switch 104 completes the circuit to the day of the month motor 35 to advance the drums 46 and 47 one additional day. This circuit is broken when the feeler 83b raises out of the slot 83a at the end of the 31st movement of the cam 83.

The February compensation is taken care of by the cam 87 having a single cutout portion 87a positioned to correspond to the second position or February of the calendar. When the feeler 87b falls into the notch 87a the switch 102 is closed and a circuit established through the switch 100 and the switch 105 to condition the motor 35 to receive three additional impulses to compensate for the 28 day month of February. The additional impulses are provided when the feeler 81b falls into the slot 81a on the cam 81 and closes the switch 106. This circuit is opened at the end of the 31st impulse when the feeler 81b rides out of the slot 81a. The leap year compensation, occasioned when February has 29 days, is made through the 1 to 4 gear arrangement 89 which operates the cam 88 to throw the switch 100 to connect the switch 105 into the actuating circuit for the motor 35. The switch 105 is closed when the feeler 82b drops into the slot 82a on the cam 82. This circuit is opened when the 31st impulse moves the feeler 82b out of the slot 82a.

*Setting*

A receptacle 125 (FIG. 3) into which the return wires 19a, 35a and 79a of the motors 19, 35 and 79 respectively, are plugged, is provided to facilitate the setting of calendar to the actual day of the week, date of the month, and month of the year at the time of putting calendar in operation. A line 126 is scribed on the 31 tooth ratchet cam 69 which is parallel to the frame 50 when the ratchet cam 69 is aligned with the drums 46 and 47 so that the first day of the month is indicated thereon. A line 128 is inscribed on the frame 84a to align with indicia 127 inscribed on the leap year cam 88 at 90° intervals, so that the proper relationship of the leap year cam 88 (as indicated hereinafter) is determined.

The actual setting procedure is as follows:

1st setting (Day of Week). Initiate operation by temporarily shorting the two wires connecting the switch 27a and the switch 109 as shown in FIG. 18b. This will start the motor 19 which will move up one step; however, in moving up, the switches 109 and 110 are repositioned which will initiate a second step thus causing a two day step up which might not bring up the day wanted. If such is the case, continue advancing until the second set of days on the wheel 20 (FIG. 4) comes into play, which, in turn, will bring the day wanted into proper position. This is the first day of the month on which the calendar is to be set.

2nd setting (Date). With the return wires 35a and 79a of the date unit and the month unit plugged in and the return wire 19a of the day of the week unit pulled out, operate the date unit manually by shorting the switch 111 for impulse to operate the rate unit one step or day at a time. (After starting, let the unit complete its cycle automatically). Continue this operation until the date unit sends an impulse to the month unit to advance it one step. This operation places the date unit in position to complete setting as follows:

1st: Pull the remaining return wires 35a and 79a from the receptacle 125.

2nd: Turn the 31 tooth ratchet cam 69 until the line 126 scribed on the cam 69 lines up parallel to the front of the frame 50.

3rd: Set the numbered ring 46 at the right to the number 1 in the indicating position facing front.

4th: Set the numbered ring 47 at left to the blank space in the indicating position facing front.

The day of the month unit is now in position to indicate 1st of month.

3rd setting (Month). In making the setting for the month module, the adjustment for leap year must be made. The leap year cam 88 is prick punched with indicia 127 such as . , . . , . . . , and . . . . on the circumference. The 1, 2 and 3 dots indicate normal years and 4 dots indicates leap year, when lined up with the line 128 scribed at right angles to the front edge of an end frame 84.

For purposes of setting for leap year effect, February must be considered as the beginning of the year because the changes must take place during February.

As the month module can only be rotated in one direction, a preliminary setting of February to indicating position facing forward is made so that the position of the punch marks on the cam 88 can be determined.

1st: Plug in return line 79a in the receptacle 125 and impulse the month unit (by shorting switch 103) until February is in the indicating position. With February in position, note the punch marks.

. indicates the February one year past a leap year at final indication for February.

. . indicates the February two years past a leap year at final indication for February.

. . . indicates the February three years past a leap year at final indication for February.

. . . . indicates a leap year February at final indication for February.

If at time of setting, the year is one year and less than two years past the February of leap year (when making setting), the monthly indicator is rotated until February and . are in proper position. If two years or less than three or three years and less than four years past leap year, the same method is used.

2nd: The month unit is impulsed to the month chosen as the starting month.

3rd: All of the return wires 19a, 35a and 79a are plugged into the receptacle 125.

Thus it is seen that the present invention provides a perpetual calendar having all the desired objects and advantages. The present calendar need not be reset until the year 2100 when a compensation for for the loss of a leap year must be made.

This invention is intended to cover all changes and modifications of the examples of the invention herein chosen for purposes of the disclosure, which do not constitute departures from the spirit and scope of the invention.

What is claimed is:

1. A continuous calendar comprising a first motor adapted to be actuated by an electrical impulse, a first drum rotated by the output shaft of the first motor, said drum having indicia designating the days of the week on the outer surface thereof, a second motor means for supplying an electrical impulse to actuate said second motor in response to rotation of the output shaft of the first motor, two independent rotatable drums movable in response to the rotation of the output shaft of the second motor, said drums having numbered indicia indicating the date of the day of the month on the outer surface thereof, the rightmost drum being numbered from 1 to 0 and the leftmost drum having the numerals—to 3, means for rotating the rightmost drum one digit for each impulse received by the second motor except for the 31st impulse in each 31 impulse sequence, means for rotating the leftmost drum one digit when the rightmost drum moves from 9 to 0 and on the 31st impulse received by the second motor in each 31 impulse sequence, a third motor, a third drum having indicia indicating the month of the year on the outer surface thereof, said drum being movable when the third motor is actuated, means for supplying an electrical impulse to energize the third motor once during each 31 impulse sequence received by the second motor, and means for providing 31 impulses to the second motor for each impulse supplied to the third motor, said means including a plurality of cams controlling switches which energize the second motor one, two, or three extra times on the last day of a 30, 29 or 28 day month, respectively.

2. A continuous calendar of modular construction comprising a day of the week module for indicating the day of the week in response to reception of an electrical impulse, the day of the week module including a first motor having an output shaft, a drum mounted on the output shaft and having indicia indicating the days of the week in sequence on the outer surface, and cam means fastened to the output shaft controlling switch means for initiating and terminating an electrical impulse to the date module, a date module for indicating the numbered day of the month in response to an electrical impulse initiated by an element in the day of the week module, and a month module for indicating the month of the year, said month module indicating the subsequent month in response to an electrical impulse initiated by an element in the date module at the end of each month, said modules being interconnected only electrically and being separate individual mechanical entities, said date module including independently operable adjacent rotatable drums, said drums having numbered indicia on their outer surfaces, the rightmost of the drums indicating the first digit of the day of the month and the leftmost of the drums indicating the second digit of the day of the month, a second motor having an output shaft, the rightmost drum being numbered from 1 to 0 and the leftmost drum having the numerals—to 3, means for rotating the rightmost drum one digit for each impulse received by the second motor except for the 31st impulse in each 31 impulse sequence, means for rotating the leftmost drum one digit when the rightmost drum moves from 9 to 0 and on the 31st impulse received by the second motor in each 31 impulse sequence, means for initiating an electrical impulse to the month module, and means for supplying additional impulses to the day of the month motor so that the day of the month motor receives the equivalent of 31 impulses each month.

3. The structure of claim 2 wherein the means for rotating the drums comprises actuating cam means operated by the motor, arms operated by the cams and adapted to rotate the drums, and lock-out cam means engaging each of the arms and also rotated by the motor, said lock-out cam means being constructed and arranged to permit said arms to rotate the drums to indicate sequentially the numbers 1 to 31 each month.

4. The structure of claim 2 wherein the means for initiating an impulse to the month module comprises a cam rotatable by the date module motor and switch means adapted to supply an electrical impulse to the month module, said cam including switch operating means adapted to operate the switch at the end of each 31 impulse sequence to the date module motor.

5. The structure of claim 2 wherein the means for supplying additional impulses to the day of the month module comprises switch cam means having switch actuating portions positioned thereon, said switch actuating portions being of different lengths and corresponding to 28 day, 29 day, and 30 day months, switch means adapted to additionally energize the day of the month motor at the end of the 28, 29 and 30 day months so that the motor receives the equivalent of 31 impulses each month, and switch actuating means for the switch means and operated by the cams.

6. The structure of claim 2 wherein the month module includes a month motor having an output shaft, a drum driven by the motor and having indicia indicating the months of the year, a shut-off cam operated by the month motor and adapted to de-energize the month motor after the output shaft has made a predetermined rotation, and 30 day month cam means, 29 day month cam means, and 28 day month cam means adapted to condition switches for energization of the day of the month module by means for supplying additional impulses thereto.

7. The structure of claim 6 wherein the 29 day month cam is operated through a 1 to 4 gear arrangement to condition its associated switch only once every four years corresponding to the February in leap year.

8. The structure of claim 5 wherein the month module includes a month motor having an output shaft, a drum driven by the motor having indicia indicating sequentially the months of the year, a shut-off cam operated by the month motor and adapted to de-energize the month motor after the output shaft has made a predetermined rotation to advance the drum to the next month of the year, 30 day month cam having cam means for conditioning the switch means to the day of the month motor associated with the 30 day switch actuation portion of the switch cam means to transmit an additional impulse to the day of the month motor at the end of a 30 day month, 28 day month cam having cam means for conditioning the switch means to the day of the month motor associated with the 28 day switch actuation portion of the switch cam means to deliver additional current to the day of the month motor at the end of a 28 day February month to cause the motor to receive the equivalent of 31 impulses that month, and 29 day month cam operated by a 1 to 4 gear arrangement to override the 28 day cam once every four years on the leap years, said 29 day month cam having cam means for conditioning the switch means to the day of the month motor associated with the 29 day switch actuation portion of the switch cam means to deliver additional current to the day of the month motor at the end of a 29 day February to cause the motor to receive the equivalent of 31 impulses that month.

9. A continuous calendar of modular construction comprising
  (a) a day of the week module for indicating the day of the week in response to reception of an electrical impulse,
  (b) a date module for indicating the numbered day of the month in response to an electrical impulse initiated by an element in the day of the week module, and
  (c) a month module for indicating the month of the year, said month module indicating the subsequent month in response to an electrical impulse initiated by an element in the date module at the end of each month,
  (d) said modules being interconnected only electrically and being separate individual mechanical entities,
  (e) said day of the week module including a motor having an output shaft, a drum mounted on the output shaft and having indicia indicating the days of the week on the outer surface, and cam means fastened to the output shaft controlling switch means for initiating and terminating an electrical impulse to the date module,
  (f) said date module including
    (1) independently operable adjacent rotatable drums, said drums having numbered indicia on their outer surfaces, the rightmost of the drums indicating the first digit of the day of the month and the leftmost of the drums indicating the second digit of the day of the month,
    (2) a motor having an output shaft,
    (3) means for rotating the drums independently from the output shaft,
    (4) means for initiating an electrical impulse to the month modules, and
    (5) means for supplying additional impulses to the day of the month motor so that the day of the month motor receives the equivalent of 31 impulses each month, and (g) said month module including
- (1) a month motor having an output shaft,
- (2) a drum driven by the motor and having indicia indicating the months of the year,
- (3) a shut-off cam operated by the month motor and adapted to de-energize the month motor after the output shaft has made a predetermined rotation, and
- (4) 30 day month cam means, 29 day month cam means, and 28 day month cam means having cam portions adapted to condition switches for energization of the day of the month module by means for supplying additional impulses thereto.

10. The structure of claim 9 wherein the means for rotating the drum comprises actuating cam means operated by the motor, arms operated by the cams and adapted to rotate the drums, and lock-out cam means engaging each of the arms and also rotated by the motor, said lock-out cam means being constructed and arranged to permit said arms to rotate the drums to indicate sequentially the numbers 1 to 31 each month, said means for initiating an impulse to the month module comprising a cam rotatable by the date module motor and switch means adapted to supply an electrical impulse to the month module, said cam including switch operating means adapted to operate the switch at the end of each 31 impulse sequence to the date module motor, said means for supplying additional impulses to the day of the month module comprising switch cam means having switch actuating portions positioned thereon, said switch actuating portions being of different lengths and corresponding to 28 day, 29 day, and 30 day months, switch means adapted to additionally energize the day of the month motor at the end of the 28, 29 and 30 day months so that the motor receives the equivalent of 31 impulses each month, and switch actuating means for the switch means and operated by the cams, and said month module including a month motor having an output shaft, a drum driven by the motor having indicia indicating sequentially the months of the year, a shut-off cam operated by the month motor and adapted to de-energize the month motor after the output shaft has made a predetermined rotation to advance the drum to the next month of the year, 30 day month cam having cam means for conditioning the switch means to the day of the month motor associated with the 30 day switch actuation portion of the switch cam means to transmit an additional impulse to the day of the month motor at the end of a 30 day month, 28 day month cam having cam means for conditioning the switch means to the day of the month motor associated with the 28 day switch actuation portion of the switch cam means to deliver additional current to the day of the month motor at the end of a 28 day February month to cause the motor to receive the equivalent of 31 impulses that month, and 29 day month cam operated by a 1 to 4 gear arrangement to override the 28 day cam once every four years on the leap years, said 29 day month cam having cam means for conditioning the switch means to the day of the month motor associated with the 29 day switch actuation portion of the switch cam means to deliver additional current to the day of the month motor at the end of a 29 day February to cause the motor to receive the equivalent of 31 impulses that month.

References Cited by the Examiner

UNITED STATES PATENTS

| | | | |
|---|---|---|---|
| 1,992,508 | 2/1935 | Sharpe et al. | 40—111 |
| 2,170,408 | 8/1939 | Hillcourt | 40—112 |
| 2,458,092 | 1/1949 | Morris | 40—112 |

EUGENE R. CAPOZIO, *Primary Examiner.*

W. J. CONTRERAS, *Assistant Examiner.*